US008062430B2

(12) United States Patent
Jetten et al.

(10) Patent No.: US 8,062,430 B2
(45) Date of Patent: Nov. 22, 2011

(54) PROCESS FOR CLEANING FILTERS

(75) Inventors: Jan Matthijs Jetten, Zeist (NL); Theodoor Maximiliaan Slaghek, Rotterdam (NL)

(73) Assignee: Nederlandse Organisatie Voor Toegepast-Natuurwetenschappelijk Onderzoek TNO (AN)

( * ) Notice: Subject to any disclaimer, the term of this patent is extended or adjusted under 35 U.S.C. 154(b) by 809 days.

(21) Appl. No.: 10/519,639

(22) PCT Filed: Jun. 23, 2003

(86) PCT No.: PCT/NL03/00461
§ 371 (c)(1),
(2), (4) Date: Feb. 8, 2006

(87) PCT Pub. No.: WO03/095078
PCT Pub. Date: Nov. 20, 2003

(65) Prior Publication Data
US 2006/0237038 A1 Oct. 26, 2006

(30) Foreign Application Priority Data
Jun. 28, 2002 (EP) ..................... 02077580

(51) Int. Cl.
*C23G 1/02* (2006.01)
*C02F 1/72* (2006.01)
(52) U.S. Cl. ............... 134/2; 134/3; 134/28; 134/29; 210/756; 210/758; 210/759
(58) Field of Classification Search ............ 134/2, 22.1, 134/22.13, 22.14, 22.18, 22.19, 26, 28, 29; 210/756, 758, 759, 749
See application file for complete search history.

(56) References Cited

U.S. PATENT DOCUMENTS

| | | | | | |
|---|---|---|---|---|---|
| 3,912,624 | A | * | 10/1975 | Jennings | 210/636 |
| 4,740,308 | A | * | 4/1988 | Fremont et al. | 210/632 |
| 4,970,005 | A | * | 11/1990 | Schuchardt | 210/759 |
| 5,647,988 | A | * | 7/1997 | Kawanishi et al. | 210/636 |
| 5,667,690 | A | * | 9/1997 | Doddema et al. | 210/631 |
| 6,045,698 | A | * | 4/2000 | Cote et al. | 210/636 |
| 6,274,186 | B1 | * | 8/2001 | Mol et al. | 426/330 |
| 6,325,938 | B1 | * | 12/2001 | Miyashita et al. | 210/636 |
| 7,052,557 | B2 | * | 5/2006 | Jetten et al. | 134/42 |

FOREIGN PATENT DOCUMENTS

| | | | |
|---|---|---|---|
| DE | 195 03 060 A1 | | 8/1996 |
| EP | 0 733 594 A1 | | 3/1996 |
| JP | 4-267933 | | 9/1992 |
| JP | 9-290141 | | 11/1997 |
| WO | WO-97/45523 | * | 12/1997 |
| WO | WO 97/45523 | | 12/1997 |
| WO | WO 98/45029 | | 10/1998 |
| WO | WO 99/15256 | | 4/1999 |

OTHER PUBLICATIONS

Trägårdh, Gun, Membrane Cleaning, *Desalination*, 1989, 71, 325-335.

* cited by examiner

*Primary Examiner* — Michael Barr
*Assistant Examiner* — Saeed T Chaudhry
(74) *Attorney, Agent, or Firm* — The Webb Law Firm

(57) ABSTRACT

Filters used in the beverage industry fouled by polyphenol-protein complexes and carbohydrate polymers can be cleaned by treating the filters either with the following methods:

Solubilization of at least part of the carbohydrate polymers followed by a treatment of the resulting polyphenol protein complex with an oxidative chemical.

Treatment of the fouled filters through a back-wash method using an oxidative chemical. In both cases it is not necessary to rinse the membranes after cleaning with a reductive chemical.

10 Claims, No Drawings

PROCESS FOR CLEANING FILTERS

BACKGROUND OF THE INVENTION

1. Field of the Invention

The invention relates to a process of cleaning food processing equipment, in particular membrane filters which are used for producing liquid foodstuffs, wherein the filters are contacted with an oxidator.

In the food industry, use is being made to an increasing extent of membrane filters, in particular plastic membranes such as polyvinylpyrrolidone, polysulphone, polyether-sulphone and certain types of polyamides, and ceramic membranes for removing undesirable insoluble matter from beverages and other liquids. Such membranes are also used for cleaning surface water. Such membranes ensure an expedient removal of undesirable constituents, in particular micro-organisms such as algae, fungi, yeast, and bacteria The problem is, however, that such membrane filters become blocked even after a short time so that they become unusable. The blocked filters can be regenerated, for example by rinsing them through in the opposite direction. However, that is a complicated process and no longer effective in the long term because the contamination accumulates. In addition, it is difficult to remove some persistent organic contaminants in this way.

2. Description of Related Art

Enzymatic processes have been proposed for cleaning membranes. Thus, WO 98/45029 describes the use of cellulases and amylases for cleaning beer filtering membranes, after alkaline pretreatment of the membrane. Similarly, JP-A 4-267933 describes the use of proteinases and cellulases for cleaning separation membranes. These non-oxidative processes, however, are usually insufficiently effective in cleaning blocked membranes.

WO 97/45523 describes the use of 2,2,6,6-tetramethylpiperidine-N-oxyl (TEMPO) as nitroxyl compound and hypochlorite and hypobromite as a reoxidator for cleaning beer-settling modules. The presence of halogen residues, especially bromine residues, is highly undesired in equipment used for preparing or treating beverages and other foodstuffs. Moreover, the amounts of oxidator and reoxidator used are high and therefore this method is relatively expensive.

WO 99/15256 discloses the use of cyclic nitroxyl compounds such as TEMPO together with a calcium-sequestering agent for cleaning filters to be used in purifying surface water. This method is not very effective for cleaning filters with heavy residues produced in the beverage industry.

U.S. Pat. No. 5,647,988 and JP-A 9-290141 disclose a method for cleaning ceramic membranes used in water-purification plants and the like, by using a back-washing method in combination with an oxidising agent such as sodium hypochlorite, chlorine and chlorine dioxide followed by a washing with a reducing agent.

Research has revealed that during the membrane separation process for cleaning foodstuffs such as beer, the membrane fouling starts with a complexation onto the membrane consisting of a complex of polyphenols and proteins. Subsequently other components such as (poly)saccharides and/or other hydrophilic residues of e.g. yeast adsorb onto the polyphenol protein complex and as a result the pores of the membranes are blocked. The blocking of the membrane pores results in reduced permeability and ultimately in an inefficient filtration process.

In order to clean the used membranes, it was surprisingly found that filters and other equipment used in the food and beverage industry can be effectively cleaned in a TEMPO-free process. The cleaning process is focused on targeting the polyphenol protein complex with an oxidising chemical aid such as sodium hypochlorite, Oxone, organic peracids or a transition metal complex together with peroxide compounds such as hydrogen peroxide or with hypohalous acids. In all cases it is not necessary that after the oxidative cleaning the membranes are treated with a reducing agent. The research has resulted in two embodiments, which are feasible for cleaning the membranes. The two embodiments of the method of the invention have in common, as the inventive concept, that the protein and/or polyphenol-containing residues are treated with the oxidising agent capable of oxidising the proteins and/or polyphenols, while minimising contact of the oxidising agent with the polysaccharides. The reduced contact with oxidising agent has the further advantage that the life cycle of the membranes is increased.

SUMMARY OF THE INVENTION

The first embodiment is focused on a two-step circular cleaning sequence whereby first the carbohydrates or other hydrophilic residues, which are attached onto the polyphenol protein complex, are treated with an alkaline solution, in particular at pH 11-14, especially 12-13. This treatment is followed by an oxidative chemical treatment. The alkaline treatment is used for (partial) solubilisation of the (poly) carbohydrates, resulting in a better access to the polyphenol protein complex, without oxidising agent being spent by oxidising the polysaccharides and other oxidisible, alkali-soluble material. The polyphenol-protein complex is subsequently removed by typical oxidative chemical aids such as sodium hypochlorite, organic and inorganic peracids and the like.

The second embodiment uses a back-wash step. Since research has revealed that the polyphenol protein complex is directly attached through physical bonds to the membrane surface, surprisingly it is possible to target the polyphenol protein complex directly using typical oxidative chemicals such as sodium hypochlorite, organic and inorganic peracids and the like. For cleaning using a back-wash, it is preferred to use a back-wash flux of between 0.5 and 100 l of cleaning solution per h per $m^2$ per h for a period of time between 1 and 100 min, depending on the degree of fouling of the membrane.

For both cleaning modes, the cleaning chemicals are used in a concentration of between 1 and 5000 ppm, especially between 30 and 1000 ppm. Direct oxidants, such as hydrogen peroxide, hypohalite and peracids, are preferably used in ranges from 200 to 2000 ppm, whereas metal catalysts are preferably used at levels from 1 to 50 ppm. Depending on the type of cleaning aid the pH may vary between 3 and 11. The cleaning temperature may be between 4 and 80° C., preferably between 15 and 60° C., most preferably between 20 and 50° C. When using direct oxidants, such as peracids and hypohalous acids (hypochlorite, hypobromite, etc.), an acid pH (below 7) was found to be more efficacious; most preferably, the pH is between 4 and 6. When using a transition metal catalyst together with a peroxide, a neutral to moderately alkaline pH is preferably used, in particular between pH 7 and 11, most preferably between 8 and 10.

After the cleaning process, using one of the above described methods, the filters are preferably rinsed with water several times before use. It is not necessary to use a reducing agent after the oxidative treatment in the process of the invention.

The peracid described may be any peralkanoic acid such as peracetic acid, perpropionic acid, perlauric acid etc., a substituted alkanoic acid such as peroxytrifluoro-acetic acid, an optionally substituted aromatic peracid such as perbenzoic acid or m-chloroperbenzoic acid, or an inorganic peracid such as persulphuric acid or permanganic acid. The peracids may be formed in situ from a precursor such as the corresponding aldehyde, (carboxylic) acid, acid anhydride, ester or amide, e.g. tetra-acetyl-ethylene-diamine (TAED), with a suitable halogen-free oxidising agent, such as hydrogen peroxide or oxygen, either before the oxidation reaction or during the oxidation reaction, or with perborates or percarbonates or the like, in the presence of acylating agents such as TAED. The peracids and hypohalous acids may be used as such, or in the form of a suitable salt, especially an alkali metal salt. A suitable form of persulphuric acid is e.g. Oxone® ($2KHSO_5 \cdot KHSO_4 \cdot K_2SO_4$), which is commercially available.

The transition metal oxidator can be a combination of a transition metal, such as iron, manganese, chromium, cobalt or vanadium, with a hydroperoxide, such as t-butyl hydroperoxide or another alkyl hydroperoxide, a hypohalite, a peracid or, preferably hydrogen peroxide or oxygen. The preferred transition metals are iron and, especially, manganese. The transition metal is preferably in the form of a complex with a nitrogen-containing organic compound, preferably containing at least two nitrogen atoms (i.e. a polyamine) such as ethylenediamine, diethylenetriamine, triazacyclononane and their N-methylated analogues, bipyridyl and the like. The transition metal catalysed system was found to be particularly effective, both in the circular and in the back-flush mode. When using the circular mode, the alkaline pretreatment can even be dispensed with when using the transition metal system, especially when a somewhat higher cleaning temperature is used, e.g. between 40 and 80° C.

For the back-wash method, the preferred oxidising agents include peracids such as Oxone, transition metal complexes with hydrogen peroxide.

It was found surprisingly that treatment of membrane filters using either of the two described methods results in a cleaning performance which is equal to or better than that treatment with hypochlorite/bromide in combination with TEMPO as described in WO 97/45523. Also the amount of cleaning chemical necessary for cleaning the membranes can be considerably reduced compared to method of WO 97/45523, since the cleaning chemical is only used to remove the polyphenol protein complex. The limited use of the chemical aid also is beneficial for the stability of the membranes used. As an example, the amount of oxidising agent to be used for cleaning membrane filters according to either one of the processes of the invention is between 100 and 2500 mg of oxidising agent (hypochlorite) per 1000 l of beer produced, whereas the process of WO 97/45523 requires about 4500 mg of hypochlorite and additional TEMPO per 1000 l of the same type of beer. Similar improvements can be achieved for filter membranes used in the production of fruit juices and the like.

The process of the invention may be used for cleaning filters used in food industry and in feed industry. Such equipment may especially be used in the production of dairy products, beer, wine, fruit juices (apple, pineapple, grape, grapefruit, orange, lemon, etc.), vegetable juices and other beverages and liquids used in food processing. Suitable examples of such equipment include pipes, tubes, capillaries, mixing devices and, in particular, filters. The filter may be of any type, including polymer membranes wherein the polymer may be polyvinylpyrrolidone, polysulphone, polyether-sulphone and especially polyamides, and ceramic membranes made of e.g. silica, aluminium oxide etc.

The process of the invention may proceed by solubilisation of carbohydrates and oxidation and/or solubilisation other high molecular weight biomolecules proteinaceous materials, polyphenolic compounds, in residues to be removed from the filters. Such cleaning procedures are preferably carried out by treating the equipment with an aqueous solution of the chemical aid. The process of the invention can be performed as a static process, i.e. batch-wise treatment of the equipment in a suitable container containing the treatment liquid for a period of between several seconds and several hours, especially between 3 minutes and 1 hour. The process can also be a dynamic process, i.e. a process wherein a continuous or semi-continuous flow of the treatment liquid is passed over or through the equipment, e.g. at a rate of 5 ml to 10 l per minute, depending on the size of the equipment. After the cleaning sequence, the equipment is rinsed with rinsing liquid, which can be water or a neutralising aqueous liquid or an organic solvent such as an alcohol solution, or a mixture or sequential combination thereof.

DETAILED DESCRIPTION OF THE INVENTION

Example 1

Cleaning Filters Using the Circular Method

A filtration membrane (hollow tube containing 40 membrane hollow fibres, pore size 0.5 micron) with a total surface area of 0.035 $m^2$ (resembling the X-flow R-100 modules used in large scale facilities) was used for dead-end filtering beer. The virgin flux of the membrane was 70 ml/sec. The fouled membrane was then recycled with a sodium hydroxide solution at pH 13 for 30 min. Then, the membrane was recirculated at room temperature with 3 liter of an oxidant solution as described in table 1 for 45 minutes. The concentration of chemicals is given in ppm (w/w). The clean water flux after the cleaning treatment is also given in table 1.

TABLE 1

| Circular cleaning | | | | |
| --- | --- | --- | --- | --- |
| example | oxidant | concentration (ppm) | pH | clean water flux (ml/sec) |
| 1.1 | hypochlorite | 2000 | 7 | 55 |
| 1.2 | hypochlorite | 2000 | 10 | 55 |
| 1.3 | peroxydisulphate | 2000 | 10 | 20 |
| 1.4 | hydrogen peroxide | 2000 | 10 | 35 |
| 1.5 | Oxone* | 2000 | 9 | 30 |

*$2KHSO_5 \cdot KHSO_4 \cdot K_2SO_4$

Example 2

Cleaning Filters by Back Flush Using Various Oxidants

A cleaned filtration membrane (clean water flux 70 ml/sec) as described in example 1 was used for dead-end filtering beer. The fouled membrane was then back-flushed at room temperature with 3 liter of an oxidant solution as described in table 2. The clean water flux after the cleaning treatment is also given in table 2.

TABLE 2

Back flush cleaning

| example | oxidant | concentration (ppm) | pH | clean water flux (ml/sec) |
|---|---|---|---|---|
| 2.1 | oxone* | 1000 | 9 | 30 |
| 2.2 | oxone | 1000 | 5 | 35 |
| 2.3 | hypochlorite | 2000 | 10 | 55 |
| 2.4 | hypochlorite | 2000 | 7 | 55 |
| 2.5 | peroxydisulphate | 2000 | 10 | 20 |
| 2.6 | peroxydisulphate + Br | 2000 + 100 | 10 | 25 |
| 2.7 | peroxydisulphate | 2000 | 7 | 20 |
| 2.8 | hydrogen peroxide | 2000 | 10 | 40 |
| 2.9 | hydrogen peroxide | 2000 | 7 | 40 |

*2KHSO$_5$•KHSO$_4$•K$_2$SO$_4$

Example 3

Cleaning Filters by Back Flush Using Various Oxidants and a Metal Catalyst

Example 3 was repeated using 2 liter of an oxidant solution at about 30° C. as described in table 3. The clean water flux after the cleaning treatment is also given in table 3.

TABLE 3

Back flush cleaning

| example | oxidant | concentration (ppm) | pH | time (min) | clean water flux (ml/sec) |
|---|---|---|---|---|---|
| 3.1 | Mn-TMTA** + H$_2$O$_2$ | 5 + 16,500 | 9.3 | 30 | 66 |
|  |  |  |  | 60 | 75 |
| 3.2 | Mn-TMTA** + H$_2$O$_2$ | 5 + 3000 | 9.3 | 30 | 62 |
|  |  |  |  | 60 | 73 |
| 3.3 | Mn-TMTA** + AcOOH | 5 + 2500 | 8.5 | 30 | 51 |
|  |  |  |  | 60 | 66 |
|  |  |  |  | 90 | 72 |
| 3.4 | Mn-TMTA** + hypochlorite | 5 + 2000 | 9.5 | 30 | 74 |
| 3.5 | hypochlorite | 2000 | 5 | 30 | 62 |
|  |  |  |  | 60 | 72 |

**TMTA: trimethyltriazonane

Example 4

Cleaning Filters by Back Flush Using Various Oxidants

Example 2 was repeated using 1 liter of an oxidant solution at 25-40° C. as described in table 4. The clean water flux after the cleaning treatment is also given in table 4.

TABLE 4

Back flush cleaning

| example | oxidant | concentration (ppm) | pH | temperature (° C.) | clean water flux (ml/sec) |
|---|---|---|---|---|---|
| 4.1 | chlorite + hypochlorite | 1300 + 300 | 9-10 | 25 | 30 |
| 4.2 | Mn-TMTA** + H$_2$O$_2$ | 5 + 10,000 | 9-10 | 40 | 75 |
| 4.3 | Mn-TMTA** + H$_2$O$_2$ | 5 + 8000 | 9-10 | 40 | 75 |

**TMTA: trimethyltriazonane

The invention claimed is:

1. A 2,2,6,6-tetramethylpiperidine-N-oxyl (TEMPO)-free process of cleaning a polymer membrane filter containing residues from filtering beverages, the residues containing water-insoluble proteins and/or polyphenols attached to the filter and polysaccharides, comprising contacting the protein and/or polyphenol containing residues with a solution containing a peroxide compound in the presence of a transition metal selected from manganese and iron, by back-flushing, wherein said peroxide is used at a concentration within the range from 200 to 2000 ppm.

2. The process according to claim 1, wherein the transition metal is complexed with a polyamine.

3. The process according to claim 1, wherein the peroxide is hydrogen peroxide.

4. The process according to claim 1, wherein the peroxide is a peracid.

5. The process according to claim 1, wherein said transition metal is used at a concentration within the range from 1 to 50 ppm.

6. The process according to claim 1, wherein the back-flush is performed at a rate of 0.5-100 liters of the solution per h per m$^2$ of filter surface.

7. A 2,2,6,6-tetramethylpiperidine-N-oxyl (TEMPO)-free process of cleaning a polymer membrane filter containing residues from filtering beverages, the residues containing water-insoluble proteins and/or polyphenols attached to the filter and polysaccharides, comprising contacting the protein and/or polyphenol containing residues with a solution containing a hypohalous acid by back-flushing, wherein said hypohalous acid is used at a concentration within the range from 200 to 2000 ppm.

8. The process according to claim 7, comprising contacting the protein and/or polyphenol containing residues with an alkaline solution prior to said contacting with said solution containing a hypohalous acid.

9. The process according to claim 8, wherein the alkaline solution has a pH between 11 and 14.

10. The process according to claim 7, wherein the back-flush is performed at a rate of 0.5-100 liters of the solution per h per m$^2$ of filter surface.

* * * * *